(12) United States Patent  (10) Patent No.: US 6,982,539 B1
Ward  (45) Date of Patent: Jan. 3, 2006

(54) MOTOR STARTING DEVICE

(75) Inventor: Charles Barry Ward, Alpharetta, GA (US)

(73) Assignee: Diversitech Corporation, Decatur, GA (US)

( * ) Notice: Subject to any disclaimer, the term of this patent is extended or adjusted under 35 U.S.C. 154(b) by 0 days.

(21) Appl. No.: 10/798,238

(22) Filed: Mar. 11, 2004

(51) Int. Cl.
  H02P 1/44 (2006.01)
(52) U.S. Cl. ...................... 318/778; 318/782
(58) Field of Classification Search ........... 318/778, 318/781, 782, 794, 795
  See application file for complete search history.

(56) References Cited

U.S. PATENT DOCUMENTS

| 3,549,970 | A | | 12/1970 | Lewus |
|---|---|---|---|---|
| 3,784,846 | A | | 1/1974 | Krick et al. |
| 4,042,964 | A | | 8/1977 | Nurnberg et al. |
| 4,196,462 | A | | 4/1980 | Pohl |
| 4,200,829 | A | | 4/1980 | Pohl |
| 4,366,426 | A | | 12/1982 | Turlej |
| 4,727,297 | A | | 2/1988 | Wolze |
| 4,751,449 | A | * | 6/1988 | Chmiel .................. 318/786 |
| 4,751,450 | A | * | 6/1988 | Lorenz et al. ........... 318/786 |
| 4,772,808 | A | | 9/1988 | Vial |
| 4,786,850 | A | | 11/1988 | Chmiel |
| 4,804,901 | A | | 2/1989 | Pertessis et al. |
| 4,820,964 | A | | 4/1989 | Kadah et al. |
| 4,906,857 | A | | 3/1990 | Cummins et al. |
| 4,917,411 | A | | 4/1990 | Cummins |
| 5,051,681 | A | * | 9/1991 | Schwarz .................. 318/786 |
| 5,103,154 | A | | 4/1992 | Dropps et al. |
| 5,162,718 | A | | 11/1992 | Schroeder |
| 5,206,573 | A | | 4/1993 | McCleer et al. |
| 5,247,236 | A | | 9/1993 | Schroeder |
| 5,296,795 | A | | 3/1994 | Dropps et al. |
| 5,528,120 | A | | 6/1996 | Brodetsky |
| 5,561,357 | A | | 10/1996 | Schroeder |
| 6,320,348 | B1 | | 11/2001 | Kadah |
| 6,407,530 | B1 | | 6/2002 | Kwon et al. |

* cited by examiner

Primary Examiner—Bentsu Ro
(74) Attorney, Agent, or Firm—Smith, Gambrell & Russell, LLP

(57) ABSTRACT

A motor starting device employs a relay to connect and disconnect an auxiliary start capacitor in parallel with the existing start capacitor of a single-phase split-capacitor induction motor. The relay is normally closed and in the initial state connects the auxiliary start capacitor in parallel with the existing start capacitor. After a source of alternating current voltage is connected to the motor, a control circuit energizes the relay to disconnect the auxiliary start capacitor after a delay time. When the source of alternating current voltage is disconnected from the motor, a relay protection circuit maintains the relay switch open until the charge has dissipated from both the existing start capacitor and the auxiliary start capacitor.

20 Claims, 2 Drawing Sheets

US 6,982,539 B1

MOTOR STARTING DEVICE

FIELD OF THE INVENTION

This invention relates to devices for providing additional starting torque for electric motors. More specifically, the present invention relates to a device which can be added to existing permanent split capacitor (PSC) motors which experienced difficulty starting due to old age or worn mechanical components.

BACKGROUND OF THE INVENTION

A single-phase permanent split-capacitor (PSC) induction motor is often used to drive a compressor for an air conditioning system. A PSC motor has two windings, a main run winding and a start winding. A start capacitor, whose value is chosen as a compromise between start and run performance, is placed in series with the start winding. This capacitor creates a phase shift the run winding and thus increases both starting and run torque, though it is not optimized for either. When power is applied, both the start winding and the run winding, aided by the phase shift of the capacitor, contribute to the necessary torque to cause initial torque and acceleration. As the motor achieves operating speed, both windings continue to contribute to the motor's torque although the run winding now contributes to a far greater degree due to its lower impedance.

Replacement devices which provide additional starting torque to PSC electric motors have been known for some time. These hard-start devices are added to systems with PSC motors that experienced difficulty starting due to motor or component wear, as well as low line voltage conditions which may hinder or prevent normal starting. These hard-start devices are both mechanical and electronic. A hard-start device typically contains an auxiliary start capacitor of suitable value to provide additional starting torque for a wide range of motor sizes and a switch component to disconnect the start capacitor after the motor has reached a nominal speed. Typically, these hard-start devices are connected in parallel to the existing run capacitor and used two wire connection systems. Hard-start devices of this type rely on either a fixed potential relay or a positive temperature coefficient thermistor to disconnect the start capacitor after the motor has reached a predetermined speed. Other hard-start devices utilize a voltage and/or time dependent circuits to control the switch off of the auxiliary start capacitor.

Where a normally closed relay is used for connecting the auxiliary start capacitor in parallel with the existing start capacitor, problems may arise when voltage is disconnected from the motor. Particularly, when voltage is disconnected from the motor, the relay returns to its normally closed position. Depending on the phase of the AC current, a large voltage from the auxiliary start capacitor may be applied across the closing contacts of the relay thereby welding or otherwise burning the relay contacts.

In addition, prior art hard-start devices which rely on a set point voltage across the run winding to disconnect the auxiliary start capacitor may not function correctly when low line voltage conditions exist. Similarly, time out circuits may prematurely disconnect the auxiliary start capacitor under conditions of low line voltage.

SUMMARY OF THE INVENTION

The present invention solves the above problems by providing a hard-start motor starting device for a single-phase split-capacitor induction motor in which an auxiliary start capacitor is connected by means a normally closed relay or a solid-state switching device in parallel with the existing start capacitor of the motor. Particularly, the motor starting device includes a timer/voltage sensor circuit which opens the relay to disconnect the auxiliary start capacitor after a predetermined time. The predetermined time is adjustable and is dependent upon the value of the AC line voltage.

The motor starting device further includes a relay protection circuit which assures that the normally closed relay remains open as long as charge exists on either the start capacitor or the auxiliary start capacitor. Consequently, the relay contacts are not subjected to a surge current that may result from the equalization of any voltage remaining on either capacitor when AC power is removed from the motor.

Therefore, it is an object of the present invention to provide a hard-start motor starting device with an auxiliary start capacitor which is disconnected from in parallel with the starting capacitor after a predetermined time which is adjustable and which is dependent upon the value of the AC line voltage.

Further objects, features and advantages will become apparent upon consideration of the following detailed description of the invention when taken in conjunction with the drawing and the appended claims.

DETAILED DESCRIPTION OF THE PREFERRED EMBODIMENT

Figure 1:
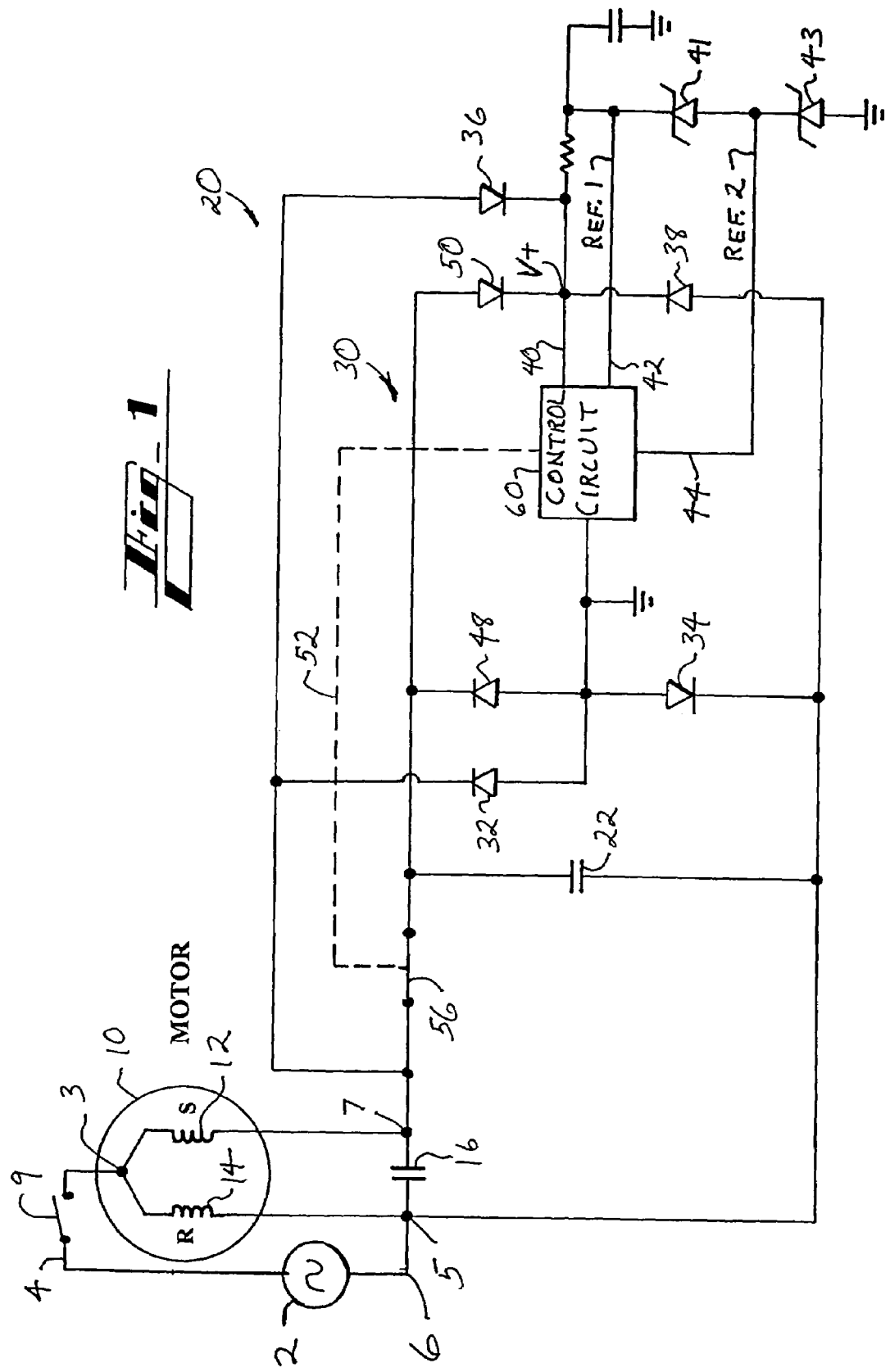
FIG. 1 is a schematic view of a motor starting device in accordance with the present invention.

Referring now to the drawings, in which like reference numerals represent like parts throughout the several views, FIG. 1 discloses a motor 10 and a motor starting device 20. The motor 10 is a single-phase permanent split-capacitor (PSC) induction motor with two windings, a main run winding 14 and a start winding 12. A single phase AC voltage source 2 is connected to the motor windings 12 and 14 by lines 4 and 6 through a motor switch 9. The line 4 is connected via the motor switch 9 to a common node 3. The line 6 is connected to the other side of run winding 14 at a node 5. A start capacitor 16 is connected between the run winding 14 at the node 5 and the start winding 12 at a node 7. The foregoing description of the motor 10 connected to the AC voltage source 2 via the motor switch 9 is conventional.

The start capacitor 16 is selected as a compromise between startup torque and run torque. Where the motor 10 is used to drive machinery, such as an air conditioner compressor, the required starting torque may increase as the air-conditioning compressor ages and parts become worn. Consequently, the existing start capacitor 16, may not provide sufficient phase shift to produce the required starting torque for the worn and aging compressor. In order to increase the starting torque for the motor 10, an auxiliary start capacitor 22 may be connected in parallel with the existing start capacitor 16. The additional capacitance provided by the auxiliary start capacitor 22 further shifts the phase between the run winding 14 and the start winding 12 to thus provide additional startup torque.

The auxiliary start capacitor 22 is part of the motor starting device 20. The motor starting device 20 thus comprises the auxiliary start capacitor 22, a relay 52 including a relay coil 54 (FIG. 2) and a normally closed relay switch 56 for connecting the auxiliary start capacitor 22 in parallel with the start capacitor 16, a full wave rectifier 30, and a control circuit 60 for controlling the operation of the relay 52 and thereby the normally closed relay switch 56. The relay 52 may be replaced by a solid-state switching device such as a silicon control rectifier (SCR) or a Triac which, like the relay 52, comprise a switch and a switch activation circuit.

With continued reference to FIG. 1, the motor starting device 20 is connected to the existing start capacitor 16 at the nodes 5 and 7. The nodes 5 and 7 are connected to the full wave rectifier 30 which comprises diodes 32, 34, 36, and 38. The junction between the diodes 32 and 34 is connected to ground, and junction between the diodes 36 and 38 is a positive DC voltage V+. The DC voltage V+ is connected to the control circuit 60 by means of a line 40. In addition to the DC voltage V+, two additional DC reference voltages, Ref. 1 and Ref. 2, are derived from V+ by means of zener diodes 41 and 43. In one embodiment of the present invention, the DC voltage Ref. 1 is approximately 17.1 volts, and the DC voltage Ref. 2 is approximately 12.1 volts. The DC reference voltages, Ref. 1 and Ref. 2, are connected to the control circuit 60 by means of the lines 42 and 44 respectively.

A relay protection circuit includes the diodes 48 and 50 shown in FIG. 1. The anode of the diode 48 is connected to ground, and the cathode of the diode 48 is connected to the junction between the auxiliary start capacitor 22 and the relay switch 56. By contrast, the cathode of the diode 50 is connected to V+, and the anode of the diode 50 is connected to the junction between the auxiliary start capacitor 22 and the relay switch 56. As will be described in connection with the operation of the motor starting device 20, the diodes 48 and 50, in conjunction with diodes 34 and 38, serve to maintain the voltage of V+ when the AC voltage source 2 has been disconnected from the motor 10 by opening the motor switch 9 and while charge still remains on the auxiliary start capacitor 22. Similarly, the diodes 32 and 36, in conjunction with diodes 34 and 38, serve to maintained the voltage of V+ when the AC voltage source 2 has been disconnected from the motor 10 and while charge still remains on the start capacitor 16.

Figure 2:
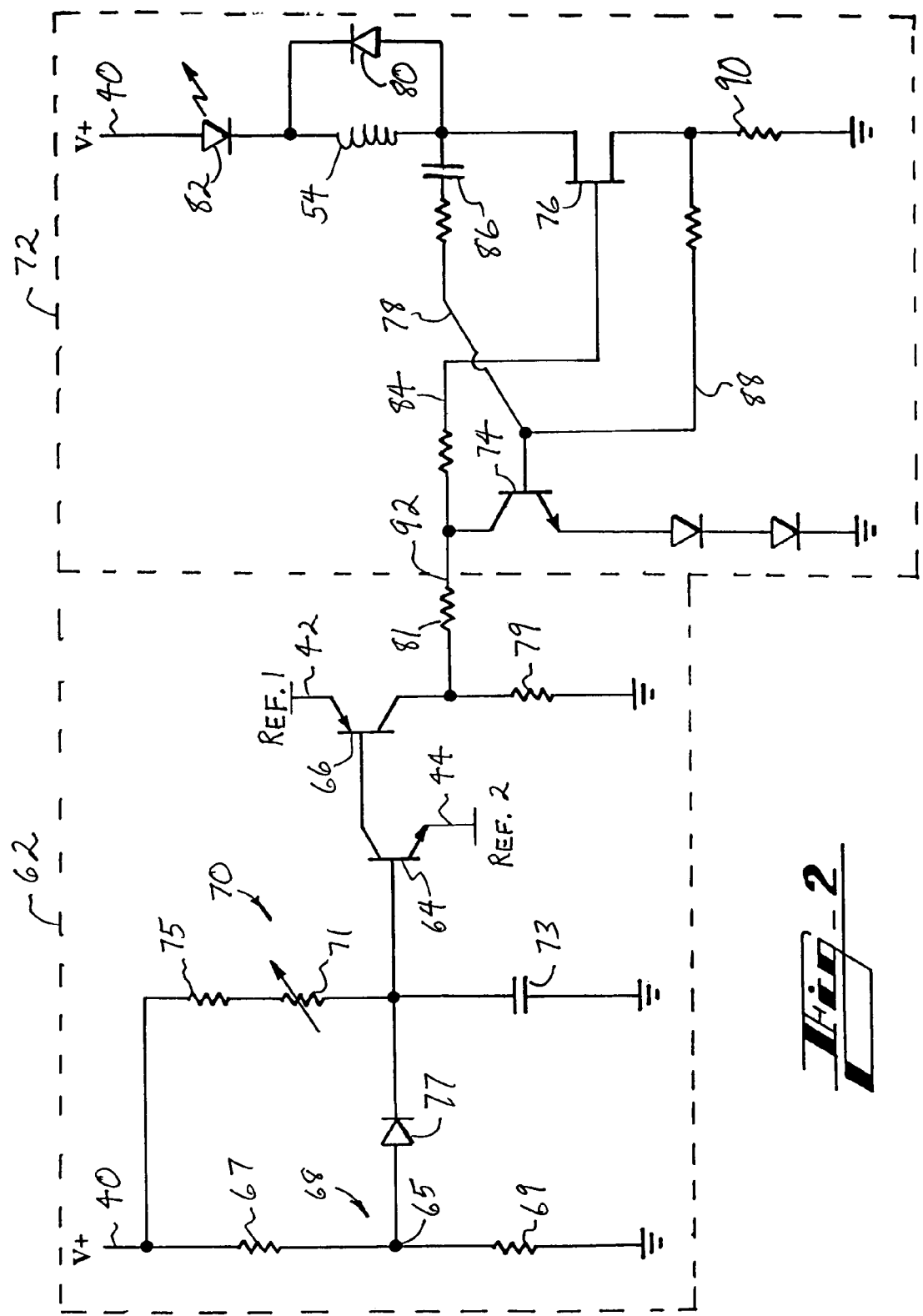
FIG. 2 is a schematic view of the control circuit which is part of the motor starting device illustrated in FIG. 1.

With reference to FIG. 2, the control circuit 60 controls the opening and closing of the relay switch 56 by energizing and deenergizing the relay coil 54 of the relay 52. The control circuit 60 comprises a timer/voltage sensor circuit 62 and a relay coil driver circuit 72. The timer/voltage sensor circuit 62 monitors the value of V+, and after a delay time dependent on the value of V+, the timer/voltage sensor circuit 62 activates the relay coil driver circuit 72. The relay coil driver circuit 72 is a multivibrator which, when activated, maintains sufficient current through the relay coil 54 to ensure that the relay switch 56 remains open while the motor 10 is running and thereafter until the charge has dissipated from the start capacitor 16 and the auxiliary start capacitor 22.

The timer/sensor circuit 62 of the control circuit 60 is connected to the V+ voltage and produces an output signal on an output 92. The output 92 is connected to the relay coil driver circuit 72. The timer/sensor circuit 62 has a pair of switching transistors 64 and 66 connected between the higher reference voltage Ref. 1 on line 42 and the lower reference voltage Ref. 2 on line 44. As long as transistors 64 and 66 remain in the off condition, the collector of transistor 66 remains at ground potential and the output signal on the output 92 remains at ground potential. With the output signal on the output 92 at ground potential, the relay coil driver circuit 72 remains inactive, no current flows in the relay coil 54, the relay switch 56 remains closed, and the auxiliary start capacitor 22 remains connected in parallel with the start capacitor 16.

The switching transistors 64 and 66 of the timer/voltage sensor circuit 62 are controlled by a timer circuit 70 and a voltage sensor 68 connected to the base of the transistor 64. Particularly, the base voltage of transistor 64 is controlled by the charge on a timing capacitor 73 connected between the base of the transistor 64 and ground. The voltage on the timing capacitor 73, and therefore the voltage on the base of the transistor 64, is dynamically controlled by the time constant of the timer circuit 70 represented by the value of the timing capacitor 73, the value of resisters 67 and 75, and the setting of potentiometer 71.

The voltage sensor 68 consisting of resistors 67 and 69 is connected between V+ and ground to produce a steady state DC voltage at node 65 which is sufficient to turn on the transistors 64 and 66 through diode 77. Once the voltage on the base of the transistor 64 exceeds the DC reference voltage Ref. 2, the transistor 64 will turn on thereby turning on the transistor 66. The flow of current through the transistor 66 and through the resistor 79 raises the voltage potential of the collector of the transistor 66 to provide an output signal through a resistor 81 on the output 92 of the timer/voltage sensor circuit 62. The output signal on the output 92 is connected to the relay coil driver circuit 72.

The relay coil driver circuit 72 is a multivibrator consisting of a transistor 74 and a field effect transistor (FET) 76. The input of the relay coil driver circuit 72 is the collector of the transistor 74. The input of the relay coil driver circuit 72 is connected to output 92 of the timer/voltage sensor circuit 62. The collector of the transistor 74 is connected to the gate of the FET 76 via a gate drive circuit 84. The voltage of the gate drive circuit 84 thereby turns on and turns off the FET 76. The drain of the FET 76 is connected to ground via a drain resistor 90. The source of the FET 76 is connected to V+ via the relay coil 54 and a light emitting diode (LED) 82. A shunt diode is connected in parallel with the relay coil 54 of the relay 52 to maintained the inductive energy in the relay coil when the FET 76 is turned off.

The FET 76 has a dynamic feedback path 78 and a static feedback path 88. The dynamic feedback path 78 is connected to the source of the FET 76. The static feedback path 88 is connected to the drain of the FET 76. Both the dynamic feedback path 78 and the static feedback path 88 are connected to the base of the transistor 74 to turn the transistor 74 off and on. The emitter of the transistor 74 is connected to ground through two diodes which provide a stable offset voltage from ground.

In operation, the motor starting device 20 controls the connection and disconnection of the auxiliary start capacitor 22 in parallel with the start capacitor 16. First, before the AC voltage source 2 is connected to the motor 10 by means of the motor switch 9, the motor starting device 20 connects the auxiliary start capacitor 22 in parallel with the existing start capacitor 16 by means of the normally closed relay switch 56. Second, the motor starting device 20 disconnects the auxiliary start capacitor 22 from the existing start capacitor 16 by opening the relay switch 56 once an adjustable delay time has elapsed. Third, when the AC voltage source 2 is disconnected from the motor 10 by means of motor switch 9, the motor starting device 20 holds the relay switch 56 open until the charge has dissipated from both the start capacitor 16 and the auxiliary start capacitor 22.

In the initial state, before the AC voltage source 2 is connected to the motor 10, V+ is at zero potential (FIG. 1). With V+ at zero potential, the FET 76 is it the off condition, and no current flows through the relay coil 54 (FIG. 2). Without current is the relay coil 54, the normally closed relay switch 56 is closed, and the auxiliary start capacitor 22 is connected in parallel with the start capacitor 16.

Turning to FIG. 1, when the single phase AC voltage source 2 is connected to the motor 10 by means of the motor switch 9, the motor 10 begins to rotate using the phase shift created by the parallel combination of the existing start capacitor 16 and the auxiliary start capacitor 22. Simultaneously, the full wave rectifier 30 converts the AC voltage supplied by the AC voltage source 2 between the node 5 and the node 7 to a DC voltage, V+, on the line 40. In addition, the reference voltages, Ref. 1 (about 17.1 volts) and Ref. 2 (about 12.1 volts) are derived from V+ with the zener diodes 41 and 43.

Turning to FIG. 2, V+ is connected to the timer/voltage sensor circuit 62. Initially, the charge on the timing capacitor 73 is zero, and the transistors 64 and 66 are both in their off condition. As a result, the output signal on output 92 of timer/voltage sensor circuit 62 remains at ground potential. The collector of the transistor 74 of the relay coil driver circuit 72 likewise remains at ground potential. Because the collector of the transistor 74 is at ground potential, the FET 76 is in the off condition. With the FET 76 in the off condition, no current flows through the relay coil 54. Without current through the relay coil 54, the normally closed relay switch 56 remains closed, and the auxiliary start capacitor 22 remains connected in parallel with the start capacitor 16.

As the motor 10 continues to spin up, the voltage on the timing capacitor 73 begins increasing. Once the voltage on the timing capacitor 73 has reached a value above the reference voltage Ref. 2, the transistor 64 will begin conducting. The time delay for the buildup of voltage on the timing capacitor 73 is set by the RC time constant established by the value of the timing capacitor 73 and the series value of the resistor 75 and the potentiometer 71. RC time constant and therefore the delay time for the timing capacitor to charge can be adjusted by means of the potentiometer 71. A variable capacitor in place of the timing capacitor 73 could also be used to control the delay time before the transistor 64 is turned on.

The delay time is also dependent on the value of the AC voltage of the AC voltage source 2. If the voltage of the AC voltage source 2 is normal, V+ will be relatively high, and charge will be added to the timing capacitor 73 through the resistor 67 and the diode 77. That parallel charge path will speed up the charging of the timing capacitor 73 and shorten the delay time. If, on the other hand, the AC voltage of the AC voltage source 2 is relatively low, V+ will be relatively low and will not contribute to the buildup of charge on the timing capacitor 73 through the diode 77 thereby increasing the delay time. With the value of V+ relatively low, the delay time will be controlled by the RC time constant established by the value of the timing capacitor 73 and the series combination of the resistor 75 and the potentiometer 70. Consequently, the voltage on the timing capacitor 73 will reach the turn on voltage for the transistor 64 more quickly if the AC voltage is high then it will if the AC voltage is low.

Once the voltage on the timing capacitor 73 and on the base of the transistor 64 reaches a value approximately 0.7 volts higher then Ref. 2, the transistor 64 will turn on. Once transistor 64 has turned on, it will turn on the transistor 66. As current flows from Ref. 1 connected to the emitter of the transistor 66 to the collector of the transistor 66, that current, passing through the resistor 79, will cause the voltage on the collector of the transistor 66 to rise above ground. Consequently, the output signal of the timer/voltage sensor circuit 62 on output 92 will be positive thereby indicating to the relay coil driver circuit 72 that the auxiliary start capacitor 22 has accomplished its purpose and that the relay coil 54 should be energized to disconnected the capacitor 22.

In order to disconnect the auxiliary start capacitor 22 from across the start capacitor 16, the relay coil driver circuit 72 receives the positive voltage input from the timer/voltage sensor circuit 62 at output 92. In response, the relay coil driver circuit 72 energizes the relay driver coil 54 to open the relay driver switch 56. In order to energize the relay driver coil 54, the FET 76 is turned on by the positive voltage from the timer/voltage sensor circuit 62 at the collector of the transistor 74, and current flows from V+ to ground through the relay driver coil 54. As the current flows through the FET 76, the voltage at the drain of the FET 76 rises as a result of the current flowing through the drain resistor 90. At some point, the voltage at the base of the transistor 74 resulting from the static feedback path 88 is sufficiently high to turn on transistor 74. When the transistor 74 turns on, the collector of the transistor 74 is pulled toward a lower voltage of approximately 1.6 volts (the voltage drop across the two diodes connected to the emitter of the transistor 74 plus the collector/emitter drop of the transistor 74). Once the collector of the transistor 74 reaches a value of approximately 1.6 volts, the FET 76 will turn off as a result of the voltage in the gate drive circuit 84. When the FET 76 turns off, the voltage on the resistor 90 will return to ground potential and the transistor 74 will subsequently turn off. With the transistor 74 turned off, the voltage on the collector of transistor 74 and therefore the gate of FET 76 will increase thereby turning on the FET 76 again. The dynamic feedback path 78 assures that the multivibrator cannot become hung up in one state or the other. Consequently, the relay coil driver circuit 72 will oscillate with the FET 76 turning on and off. The frequency of the oscillation is determined primarily by the value of the inductance of the relay coil 54 and the resistor 90. The duty cycle of the FET 76, however, is sufficient to maintain enough current in the relay coil 54 to hold the relay switch 56 open. During the time that the relay coil 54 has current, the light emitting diode (LED) 82 will glow indicating that the relay coil 54 is energized, that the relay switch 56 is open, and that the auxiliary start capacitor 22 is disconnected.

When the AC voltage source 2 is removed from the motor 10 by opening motor switch 9 and depending on the phase of the AC voltage source 2, the start capacitor 16 and the auxiliary start capacitor 22 may be polarized such that a substantial potential exists across the open contacts of the relay switch 56. If the relay switch 56 is allowed to close immediately upon the removal of the AC voltage source 2, the existing potential across the contacts of the relay switch 56 may be sufficient to weld or burn the contacts of the relay switch 56. Consequently, the relay switch 56 must remain open until the residual charges on the start capacitor 16 and on the auxiliary start capacitor 22 have dissipated. In order to accomplish that function, a relay protection circuit is employed. The relay protection circuit comprises diodes 48 and 50, in conjunction with diodes 34 and 38, for receiving the charge from auxiliary start capacitor 22 and diodes 32 and 36, in conjunction with diodes 34 and 38 for receiving the charge from start capacitor 16. The diodes 48 and 50, in conjunction with diodes 34 and 38, rectify the voltage from the auxiliary start capacitor 22 to maintain the voltage V+. Similarly, the diodes 32 and 36, in conjunction with diodes 34 and 38, rectify the voltage from the start capacitor 16 to maintain the voltage V+. As long as the voltage V+ remains above a preestablished level, the voltage at the node 65 of the voltage divider 68 of the timer/voltage sensor circuit 62 (FIG. 2) will be sufficiently high to keep the transistor 64 turned on. As long as the transistor 64 remains on, the output of the timer/voltage sensor circuit 62 will be positive, and the relay coil driver circuit 72 will continue to provide current to the relay coil 54 to hold the relay switch 56 open. Once the charges have dissipated from the start capacitor 16 and from the auxiliary start capacitor 22, the voltage V+ will drop below the preestablished level required to maintain a positive output from the timer/voltage sensor circuit 62, and the relay coil driver circuit 72 will deenergize the relay coil thereby closing the normally closed relay switch 56 in anticipation of the next motor start sequence.

While this invention has been described with reference to preferred embodiments thereof, it is to be understood that variations and modifications can be affected within the spirit and scope of the invention as described herein and as described in the appended claims.

I claim:

1. A motor starting device for a single-phase split-capacitor induction motor connected to a source of alternating current voltage, the motor having a run winding, a start winding, and a start capacitor, the starting device comprising:
   a. an auxiliary start capacitor;
   b. a switching device comprising:
      i. a normally-closed switch which, when closed, connects the auxiliary start capacitor in parallel with the start capacitor and, when opened, disconnects the auxiliary start capacitor from the start capacitor;
      ii. a switch activation circuit for opening the normally-closed switch;
   c. a bridge rectifier connected through the motor windings to the source of alternating current voltage for producing a source of direct current voltage when the source of alternating current voltage is connected to the motor;
   d. a control circuit connected to the source of direct current voltage and connected to the switch activation circuit for selectively energizing and deenergizing the switch activation circuit; and
   e. a self-protecting switch protection rectifier circuit connected to the auxiliary start capacitor for maintaining the source of direct current voltage connected to the control circuit when the source of alternating current voltage is disconnected from the motor.

2. The motor starting device of claim 1, wherein the self-protecting switch protection rectifier circuit further comprises a pair of diodes connected to the start capacitor, the auxiliary start capacitor, and the bridge rectifier in order to conduct charge from either the start capacitor or the auxiliary start capacitor to the control circuit after the source of alternating current voltage is disconnected from the motor.

3. The motor starting device of claim 1, wherein the control circuit energizes the switch activation circuit after a delay time from the connection of the source of alternating current voltage to the motor and wherein the control circuit maintains the switch activation circuit energized as long as charge exists on the start capacitor or the auxiliary start capacitor after the source of alternating current voltage is disconnected from the motor, wherein the control circuit further comprises:
   a. a timer/voltage sensor circuit having an input connected to the source of direct current voltage and an output, the timer/voltage sensor circuit comprising:
      i. a timer for measuring the time after the alternating current voltage is connected to the motor;
      ii. a voltage sensor for determining the value of the voltage of the source of direct current voltage;
      iii. an interconnection between the voltage sensor and the timer so that the timer is adjusted based on the value of the voltage of the source of direct current voltage; and
      iv. an output signal present on the output of the timer/voltage sensor circuit at the end of the elapsed time; and
   b. a switch activation circuit driver connected to the output of the timer/voltage sensor circuit for energizing the switch activation circuit in response to the output signal from the timer/voltage sensor circuit after the elapsed time.

4. The motor starting device of claim 3, wherein the timer/voltage sensor circuit further includes a manual adjustment for varying the elapsed time.

5. The motor starting device of claim 3, wherein the switch activation circuit driver is a multivibrator.

6. The motor starting device of claim 1 wherein said switch activation circuit comprises a relay coil.

7. The motor starting device of claim 6 further comprising a light emitting diode connected to the relay coil, the light emitting diode glowing when the relay coil is energized.

8. A motor starting device for a single-phase split-capacitor induction motor connected to a source of alternating current voltage, the motor having a run winding, a start winding, and a start capacitor, the starting device comprising:
   a. an auxiliary start capacitor;
   b. a switching device comprising:
      i. a switch which, when closed, connects the auxiliary start capacitor in parallel with the start capacitor;
      ii. a switch activation circuit for opening and closing the switch;
   c. a rectifier connected through the motor windings to the source of alternating current voltage for producing a source of direct current voltage when the source of alternating current voltage is connected to the motor;
   d. a control circuit connected to the source of direct current voltage and connected to the switch activation circuit for energizing the switch activation circuit after a delay time from the connection of the source of alternating current voltage to the motor and for maintaining the switch activation circuit energized as long as charge exists on the start capacitor or the auxiliary start capacitor after the source of alternating current voltage is disconnected from the motor, wherein the control circuit comprises:
      i. a timer/voltage sensor circuit having an input connected to the source of direct current voltage and an output, the timer/voltage sensor circuit comprising:
         (a) a timer for measuring the time after the alternating current voltage is connected to the motor;
         (b) a voltage sensor for determining the value of the voltage of the source of direct current voltage;

(c) an interconnection between the voltage sensor and the timer so that the timer is adjusted based on the value of the voltage of the source of direct current voltage; and (d) an output signal present on the output of the timer/voltage sensor circuit at the end of the elapsed time; and ii. a switch activation circuit driver connected to the output of the timer/voltage sensor circuit for energizing the switch activation circuit in response to the output signal from the timer/voltage sensor circuit after the elapsed time.

9. The motor starting device of claim 8, wherein the timer/voltage sensor circuit further includes a manual adjustment for varying the elapsed time.

10. The motor starting device of claim 8, wherein the switch activation circuit driver is a multivibrator.

11. The motor starting device of claim 8, wherein the starting device further comprises a switch protection circuit connected to the auxiliary start capacitor for maintaining the source of direct current voltage connected to the control circuit when the source of alternating current voltage is disconnected from the motor.

12. The motor starting device of claim 8 wherein said switch activation circuit comprises a relay coil.

13. A motor starting device for a single-phase split-capacitor induction motor connected to a source of alternating current voltage, the motor having a run winding, a start winding, and a start capacitor, the starting device comprising:

a. an auxiliary start capacitor;
b. a switching device comprising a normally-closed switch which, when closed, connects the auxiliary start capacitor in parallel with the start capacitor and, when opened, disconnects the auxiliary start capacitor from the start capacitor;
c. a full wave rectifier connected through the motor windings to the source of alternating current voltage for producing a source of direct current voltage when the source of alternating current voltage is connected to the motor;
d. a control circuit connected to the source of direct current voltage, the control circuit comprising a switching device driver connected to the switching device for selectively energizing and deenergizing the switching device; and
e. a rectifier protection circuit connected to the auxiliary start capacitor for maintaining the source of direct current voltage connected to the control circuit when the source of alternating current voltage is disconnected from the motor.

14. The motor starting device of claim 13, wherein the rectifier protection circuit comprises at least two diodes connected between the full wave rectifier and both the start capacitor and the auxiliary start capacitor in order to conduct charge from either the start capacitor or the auxiliary start capacitor to the control circuit after the source of alternating current voltage is disconnected from the motor.

15. The motor starting device of claim 13, wherein the control circuit energizes the switching device after a delay time from the connection of the source of alternating current voltage to the motor and wherein the control circuit maintains the switching device energized as long as charge exists on the start capacitor or the auxiliary start capacitor after the source of alternating current voltage is disconnected from the motor, wherein the control circuit further comprises:

a timer/voltage sensor circuit having an input connected to the source of direct current voltage and an output; and wherein the switching device driver is connected to the output of the timer/voltage sensor circuit for energizing the switching device in response to the output signal from the timer/voltage sensor circuit after the elapsed time.

16. The motor starting device of claim 15, wherein the timer/voltage sensor circuit comprises:

a. a timer for measuring the time after the alternating current voltage is connected to the motor;
b. a voltage sensor for determining the value of the voltage of the source of direct current voltage;
c. an interconnection between the voltage sensor and the timer so that the timer is adjusted based on the value of the voltage of the source of direct current voltage; and
d. an output signal present on the output of the timer/voltage sensor circuit at the end of the elapsed time.

17. The motor starting device of claim 16, wherein the timer/voltage sensor circuit further includes a manual adjustment for varying the elapsed time.

18. The motor starting device of claim 15, wherein the switching device driver is a multivibrator.

19. The motor starting device of claim 13 wherein said switching device comprises a relay coil.

20. The motor starting device of claim 13 further comprising a light emitting diode connected to the switching device, the light emitting diode glowing when the switching device is energized.

* * * * *